United States Patent [19]
Chester

[11] Patent Number: 6,014,836
[45] Date of Patent: Jan. 18, 2000

[54] HAND-HELD HERBICIDE APPLICATOR

[76] Inventor: Steven G. Chester, 1909 Buffalo Bend Dr., Lewisville, Tex. 75067

[21] Appl. No.: 09/209,499

[22] Filed: Dec. 11, 1998

[51] Int. Cl.[7] .......................... A01C 21/00; A01C 21/02; B05C 21/00; A46B 11/00
[52] U.S. Cl. ............................ 47/1.5; 401/140; 401/196; 401/204; 401/205
[58] Field of Search ................... 47/1.5, 1.7; 401/140, 401/196, 204, 205

[56] References Cited

U.S. PATENT DOCUMENTS

| | | | |
|---|---|---|---|
| 4,027,986 | 6/1977 | Patrick | 47/1.5 |
| 4,291,491 | 9/1981 | Maddock | 47/1.5 |
| 4,305,224 | 12/1981 | Maddock | 47/1.5 |
| 4,309,842 | 1/1982 | Jones | 47/1.5 |
| 4,357,779 | 11/1982 | Maddock | 47/1.5 |
| 4,409,755 | 10/1983 | Maddock | 47/1.5 |
| 4,597,219 | 7/1986 | Kropf | 47/1.5 |
| 4,727,678 | 3/1988 | Struve et al. | 47/1.5 |

*Primary Examiner*—Michael J. Carone
*Assistant Examiner*—Son T. Nguyen
*Attorney, Agent, or Firm*—John E. Vandigriff

[57] ABSTRACT

A herbicide applicator has a handle and a dispensing end which, in one embodiment may be detachable. Herbicide is introduced into the handle and flows through the handle to the dispensing end. The dispensing end has a plurality openings through which the herbicide flows. An absorbent sleeve is over the dispensing end to control the herbicide flow. The absorbent sleeve has concentric ridges between which the herbicide is dispensed.

9 Claims, 6 Drawing Sheets

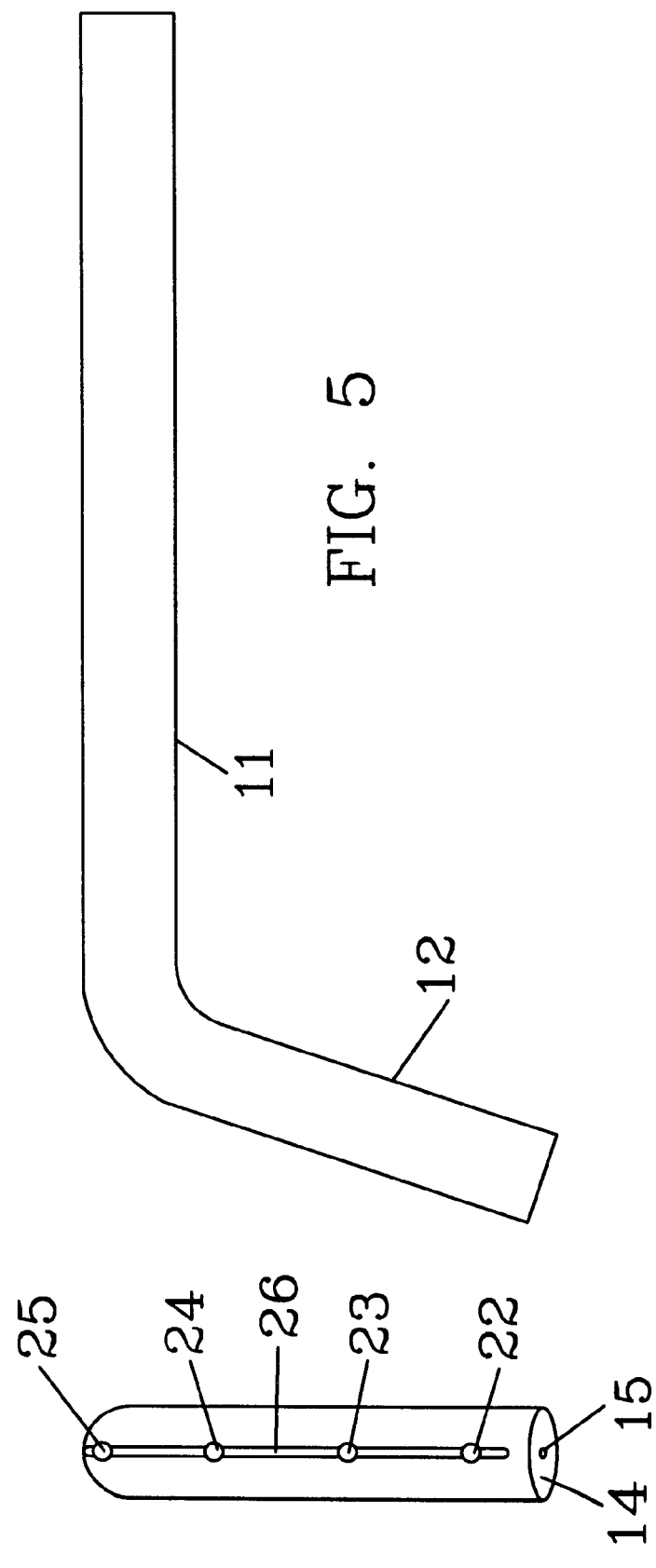

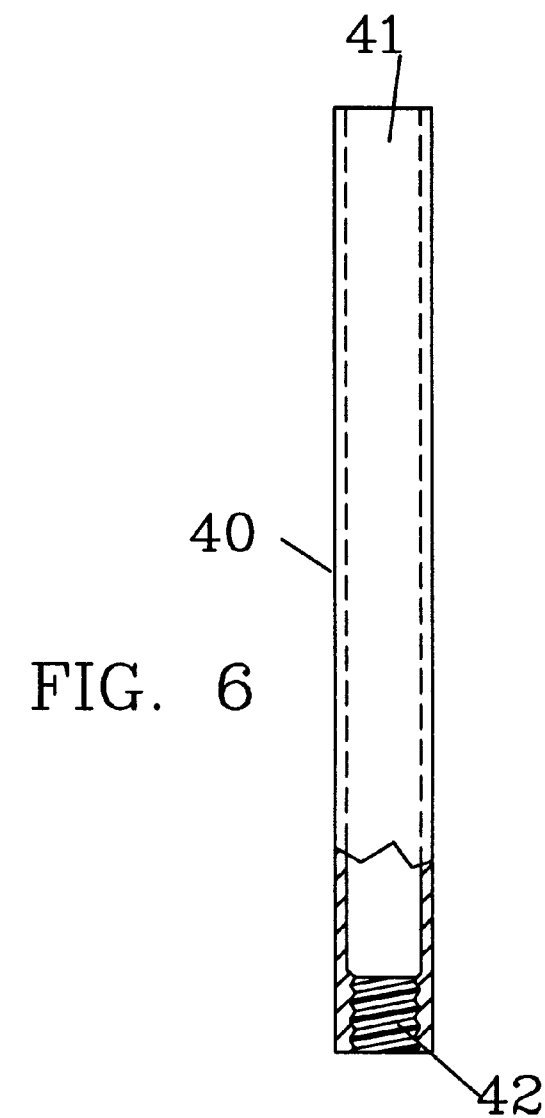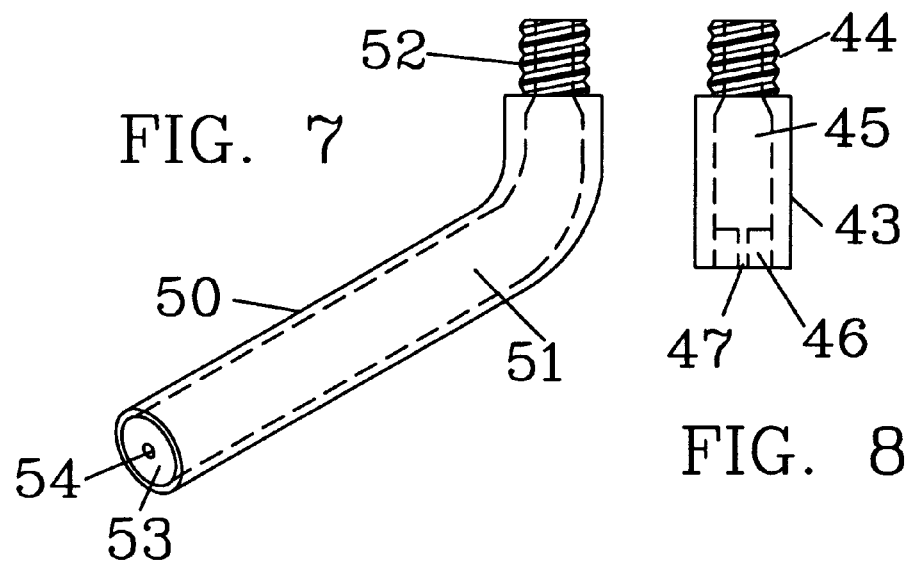

HAND-HELD HERBICIDE APPLICATOR

FIELD OF THE INVENTION

This invention relates generally to contact herbicide applicators and more particularly to hand-held precision contact herbicide applicators for lawn and gardening use.

BACKGROUND OF THE INVENTION

Many systems have been developed for applying liquid herbicides to weeds. Aside from spraying, most herbicide applicators employ a contact applicator head or wiper bar designed to be saturated with herbicide liquid and wiped over the weeds. Herbicide is thereby transferred from the surface of the applicator to the weeds. Contact herbicide applicators have come to be generally preferred over spray applicators in certain situations, in particular to apply non-selective herbicides such as ROUNDUP to weeds growing among desirable vegetation. However, such herbicides are expensive. Therefore, an important concern is to minimize waste. Controlling dripping is also important to protect desirable plants.

Hand-held contact herbicide applicators are primarily used for lawns and gardens. Some applicator designs simply provide handles with an absorbent head or mop which is dipped into a container of herbicide. Another common design is a hockey-stick shaped tool which uses an internal gravity feed system with the flow rate to the wiper or wicking head regulated by an operator-controlled valve.

For example, U.S. Pat. Nos. 4,291,491, 4,305,224, and 4,357,779 to Maddock generally disclose applicators having a vented storage chamber at the top of the handle for herbicide liquid and a drip valve in the handle for metering a predetermined amount of fluid down the handle to a wicking head. The operator must adjust the valve setting to match herbicide flow to the rate at which weeds are wiped. Too much flow and the wicking head drips and wastes herbicide. Too little, and not enough herbicide, is wiped on the weeds. Hence, frequent operator adjustment is required.

Other hand-held contact applicators are known, such as U.S. Pat. No. 4,409,755 to Maddock, which use the entire handle as the reservoir for the liquid. An orifice is provided at a joint between the wicking head and the handle for metering herbicide liquid into the wicking head. The foregoing forms of applicators ordinarily tend to supply too much liquid to the wicking head, resulting in leakage and waste of the expensive herbicide liquid and damage to desired plants.

Another hand-held herbicide applicator designed particularly for spot-applying herbicide by direct contact with woody-type vegetation is disclosed in U.S. Pat. No. 4,027,986 to Patrick. That applicator uses a hollow handle for storage of herbicide liquid and a partial vacuum is maintained at the top of the handle. An operator-controlled air-bleed valve at the top end of the handle is actuated to bleed air into the handle to regulate an otherwise free flow of liquid into the applicator head. While this system enables better control of the flow of herbicide liquid to the wicking head, it still requires the operator to adjust a valve often to assure an adequate yet not excessive supply of liquid herbicide.

U.S. Pat. No. 4,403,881 to Keeton uses an upper portion of the handle to store herbicide liquid above a diaphragm with a small slit extending through it. A manual pump mechanism is provided at the top of the handle to expel a small amount of liquid at a time through the slit. This design also requires frequent action by the operator to provide an adequate amount of liquid to the applicator head.

U.S. Pat. No. 4,369,596 to Hartford discloses a contact herbicide applicator for mounting on the back of a lawnmower. Hartford uses a feed arrangement for supplying herbicide liquid from an elevated tank under a partial vacuum to a large-diameter tube which is partially filled to serve as a wiper bar. The herbicide liquid is dispensed into a surrounding wicking material through a plurality of holes in rows extending horizontally along the opposite sides of the wiper bar. Such an apparatus appears to alleviate the need for manual control but continuously feeds liquid herbicide to the wiper bar and therefore would likely drip when not actually wiping. Also, anytime the wiper bar is tilted from horizontal, the supply of liquid to the wicking material would be uneven and dispensing of liquid from the tank would either cease or increase depending on the direction of tilt.

For agricultural field use, U.S. Pat. No. 4,332,107 to Reed discloses a multi-layer applicator wiper bar mounted on the front end of a tractor. Herbicide liquid is gravity-fed to surrounding wicking material through rows of holes extending along the wiper bar. The flow of liquid herbicide is regulated by adjusting the liquid pressure or head at the wiper bar by raising or lowering a tank of liquid herbicide carried on the tractor. Like the hand-held applicators, this system also requires constant monitoring by the operator to assure an adequate yet not excessive flow of herbicide liquid to the wiper bar. A commercially-available wiper bar similar to Reed's is the Weed Wiper Super-7 TM offered by Century Engineering, P.O. Box 3018, Cedar Rapids, Iowa 52406. Flow of liquid herbicide from a reservoir tank to the wiper bar is controlled by an operator-actuated solenoid valve. Excess liquid flow easily occurs with this system, which wastes herbicide and could damage the crops. This wiper bar, as well as those disclosed above requires constant operator supervision for proper herbicide feed rates.

SUMMARY OF THE INVENTION

The invention is a herbicide applicator including a handle and a dispensing end which, in one embodiment may be detachable. Herbicide is introduced into the handle and flows through the handle to the dispensing end. The dispensing end has a plurality openings through the which herbicide flows. An absorbent sleeve is over the dispensing end to control the herbicide flow. The absorbent sleeve has concentric ridges between which the herbicide is dispensed.

BRIEF DESCRIPTION OF THE DRAWINGS

FIG. 4 is an end view of the applicator;

FIG. 5 is a side view of the invention:

FIGS. 6–8 shows the parts of an another embodiment of the applicator.

DETAILED DESCRIPTION OF A PREFERRED EMBODIMENT

Figure 1:
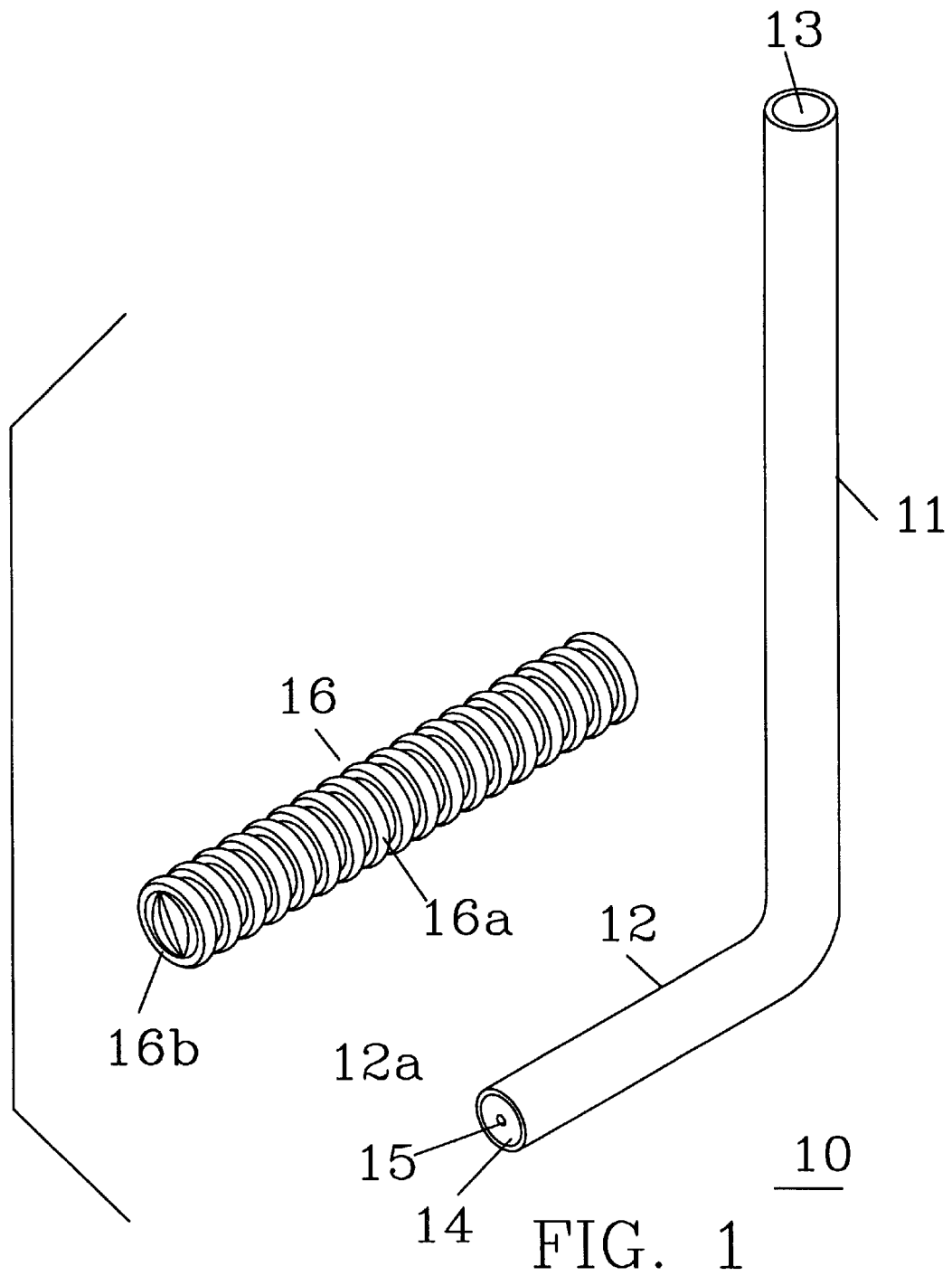
FIG. 1 is an isometric view of an embodiment of the invention.

FIG. 1 shows an embodiment of the applicator of the present invention. Applicator 10 includes a tubular handle 11 and an angled dispenser end 12 from which the herbicide is dispensed. Dispenser end 12 has an opening in which an aperture plug 14 is inserted. Plug 14 has an opening or aperture 15 extending from the inside of end 12 to the outside of plug 14. Herbicide is introduced into applicator 10 through opening 13 in handle 11. Contrary to prior art applicators, there is no supply reservoir inside apparatus 10, but herbicide is introduced into applicator 10 as it is needed by, for example, a hand spray bottle, spraying a small amount of herbicide into applicator 10. Applicator 10 has additional openings illustrated in FIGS. 3a and 3 below.

Another part of applicator 10 is cover 16 which is a ribbed sleeve that is placed over end 12 and a part of handle 11. Sleeve 16 has ribs 16a and, is enclosed at end 16b. Sleeve is made of an absorbent material with a ribbed texture similar to corduroy material.

Figure 2:
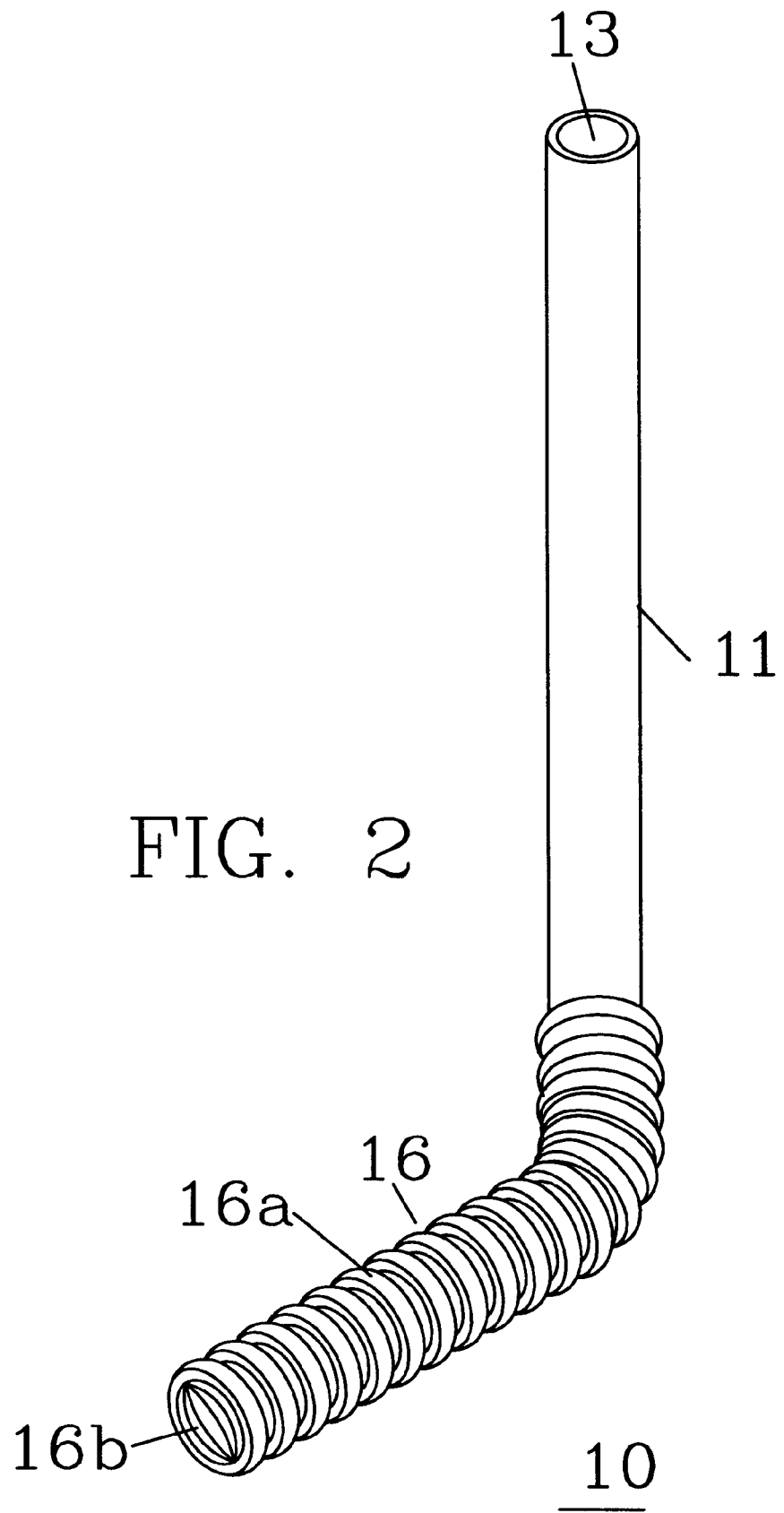
FIG. 2 shows the assembled parts of the invention.

FIG. 2 shows applicator 10 assembled with sleeve 16 mounted on end 12 and a part of handle 11. Sleeve 16 is pulled over end 12a (FIG. 1) and along end 12 and partially up handle 11. Ribs 16a encircle end 12 and handle 11. Sleeve 16 is enclosed at end 16b.

Figure 3:
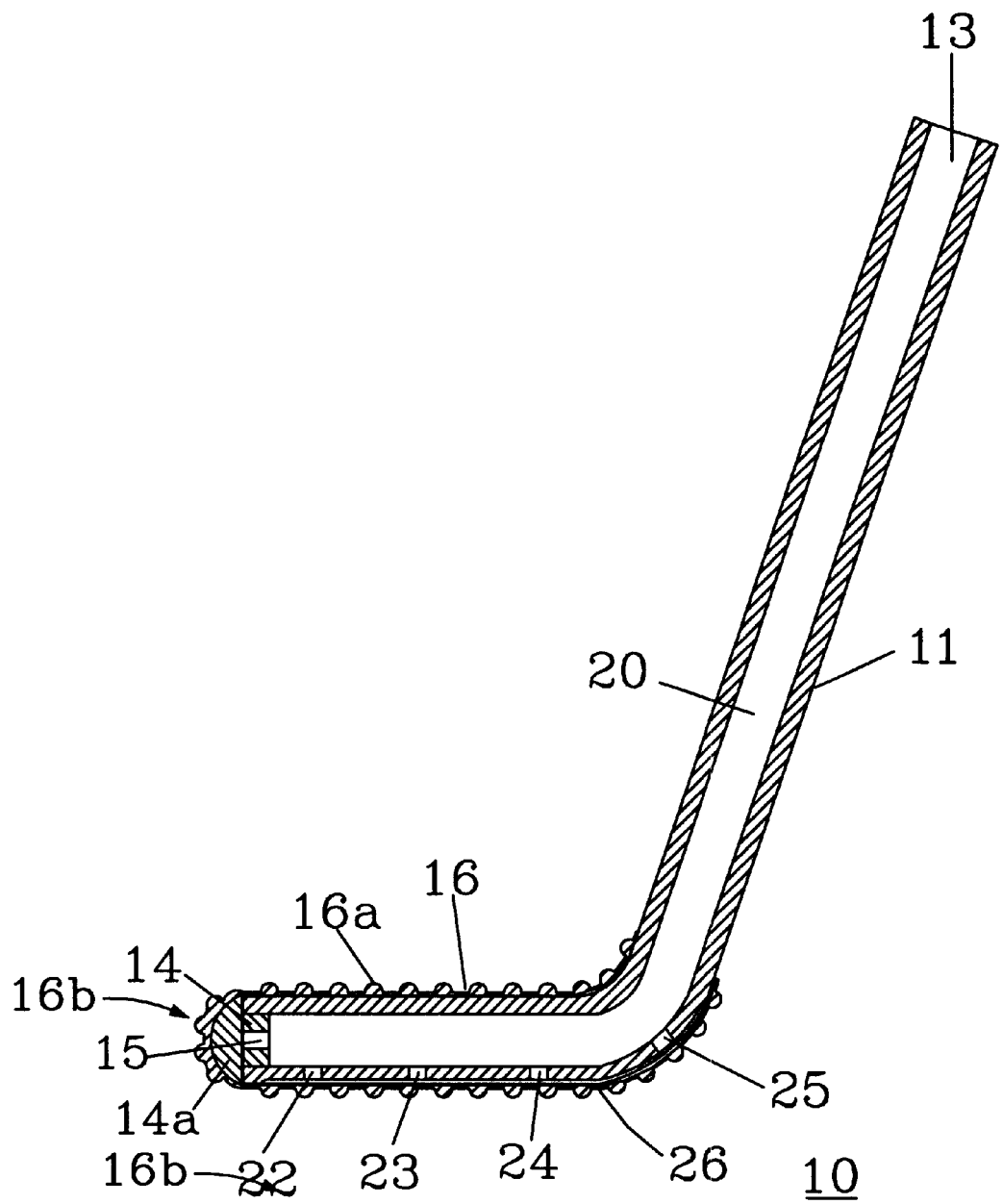
FIG. 3 is a side view in cross-section of the applicator.

FIG. 3 is a cross-sectional view of applicator 10. As illustrated, applicator is a single tubular apparatus that has a handle 11 and an applicator end 12 angled from handle 11, with a central opening or channel 20 extending from opening 13 in handle 11 to plug 14, with opening 15, in the end of applicator 12. Applicator end 12 also has several openings 22–24 which extend through the wall of end 12 from the inside channel 20 to the out side of end 12. There is at least one other opening 25 in the curved or transition portion between handle 11 and end 12. Extending along the bottom portion of end 12 is a channel or groove 26 which extends from a point adjacent to plug 14 beyond opening 25.

Figure 3A:
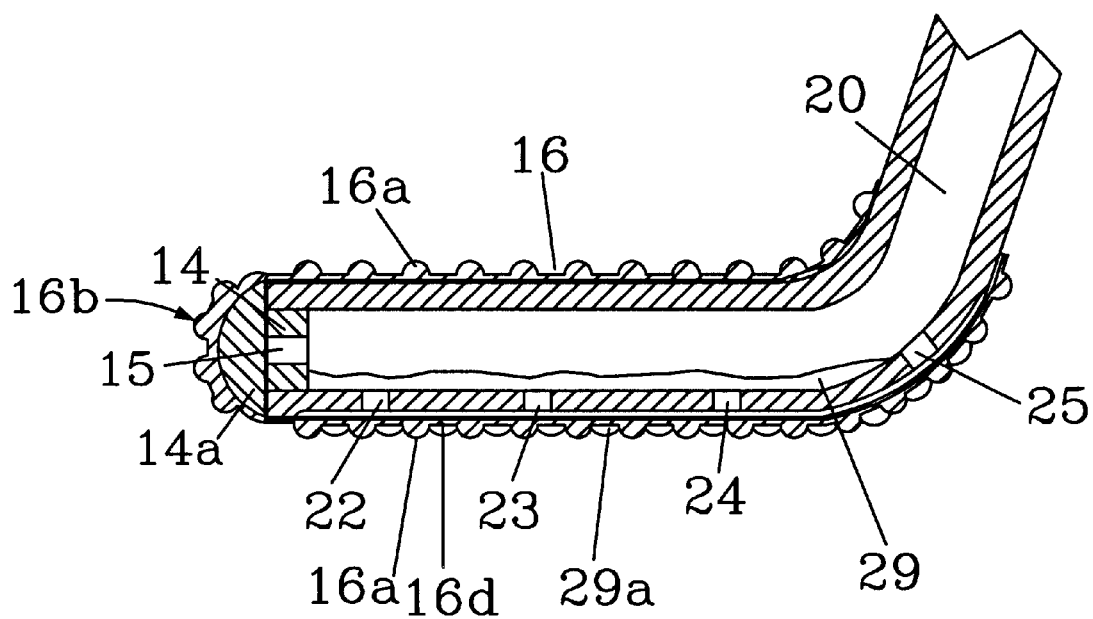
FIG. 3a is a partial view of the applicator.

FIG. 3a is a partial cross-sectional view of applicator end 12 showing the ribs 16a of sleeve 16 and the herbicide dispensing openings 22–25. Sleeve 16 has ribs 16a encircling apparatus end 12. Herbicide 29, inside of end 12 seeps through openings 15 and 22–25 wetting sleeve 16. A meniscus 29a of herbicide forms in the space 16d between ribs 16a. Ribs 16a are also across the closed end of sleeve 16 covering opening 15. An absorbent material 14a may be adjacent opening 15, inside sleeve end 16b to prevent an excessive amount of herbicide from flowing out of opening 15.

FIG. 4 is an end view of applicator 10 showing the bottom of end 12 and plug 14, with sleeve 16 removed. Plug 14 has an opening 15 through which herbicide passes to wet sleeve 16 (not illustrated). There are three opening 22–24 extend through the bottom wall of end 12, and another hole 25 extending though applicator 10 wall at the bend or transition between handle 11 and end 12. A channel 26 extends along the bottom of end 12 and extends from hole 22 to hole 25. Channel 26 allows herbicide to flow out of openings 22–25 and along the bottom of end 12, wetting sleeve 16 (not illustrated).

FIG. 5 is a side view of applicator 10 showing handle 11 and end 12.

FIGS. 6, 7 and 8 show a second embodiment of a herbicide applicator. Handle 40 has a channel 41 extending the length of handle 40. At the lower end of handle 40 are internal threads 42 to which is connected a second part of an herbicide applicator. A first part may be, for example, the curved end 50 (FIG. 7) which is connected to handle 40 by threads 52 which are screwed into threads 42. Curved part 50 has an NS in drawing 51 ending in plug 53 having an opening 54. Part 50 also may have a channel and openings (not illustrated) in the bottom side similar to channel 26 and openings 22–25 shown in FIG. 4. When in use, the combination of handle 40 and end 50 will utilize a sleeve similar to sleeve 16 of FIGS. 1–3.

In another combination, handle 40 may be joined to end 43 which is joined to threads 42 by threads 44. End 43 has a channel 45 extending to plug 46, which has an opening 47 extending through plug 46. An absorbent sleeve (not illustrated) may be placed over end 43 for applying herbicide.

In operation, a small mount of herbicide is place in opening in handle 11. It may be poured in or, preferably, it is sprayed in by a small spray bottle to prevent spillage, and to prevent placing an excess of herbicide into applicator 10. The herbicide flows to end 12 and through openings 15 and 22–25 to wet sleeve 16. Applicator can be wiped over a large area using the bottom of end 12 or a smaller area by placing end 16b (FIG. 3) of sleeve 16 on a small weed. Similarly, the curved portion of applicator, adjacent to opening 25 (FIG. 3), may be placed on a weed. When the bottom portion of end 12 is wiped across weeds, the weed stems or leaves will be channeled between the ribs 16a wiping the herbicide on and between ribs 16a along the weed stems and leaves.

The embodiment of FIGS. 6–8 provides the adaptability of having a broad wiping area of the bottom of end 50 and the small application area of the end of plug 46.

What is claimed:

1. A herbicide applicator, comprising:
    a handle;
    a dispensing end, having a bottom side, connected and extending from said handle at an angle;
    a fluid channel inside said handle and extending through said dispensing end;
    a plurality of openings in the bottom side of said dispensing end for dispensing a herbicide;
    a single channel recessed into said the bottom side of said dispensing end and extending along said bottom side interconnecting at least some of said plurality of openings in said bottom side; and
    an absorbent sleeve over said dispensing end and said plurality of openings.

2. The applicator according to claim 1, including a plug in an end of said dispensing end, said plug including at least one opening.

3. The applicator according to claim 1, wherein said absorbent sleeve has a plurality of concentric ridges on the surface of said sleeve.

4. The applicator according to claim 1, wherein said dispensing end is detachable from said handle.

5. A herbicide applicator, comprising:

a handle;

a dispensing end having a bottom dispensing surface connected to and extending from said handle at an angle;

a fluid channel inside said handle and extending through said dispensing end;

a plurality of openings in said dispensing end interconnected by a recessed channel in said bottom dispensing surface for dispensing a herbicide; and an absorbent sleeve, having a plurality of concentric ridges on the surface of said absorbent sleeve, over said dispensing end and said plurality of openings.

6. The applicator according to claim 5, including a plug in an end of said dispensing end, said plug including one of said plurality of openings.

7. The applicator according to claim 5, wherein said dispensing end is detachable from said handle.

8. A herbicide applicator, comprising:

a handle;

a dispensing end, having a bottom dispensing surface, connected to and extending from said handle at an angle, and a plug closing the dipensing end;

a fluid channel inside said handle and extending through said dispensing end;

a recessed dispensing channel outside of and extending along the bottom dispensing surface;

a plurality of dispensing openings in said bottom dispensing surface interconnecting the fluid channel with the dispensing channel for dispensing a herbicide; and an absorbent sleeve, having a plurality of concentric ridges on the surface of said absorbent sleeve, over said dispensing end and said plurality of openings.

9. The herbicide applicator according to claim 8, wherein said dispensing end has a dispensing opening where the dispensing end is connected to said handle, along said dispensing channel out said of said bottom dispensing surface, and through an opening in the plug in the end of the dispensing end.

* * * * *